US012785091B2

(12) United States Patent
Kang et al.

(10) Patent No.: US 12,785,091 B2
(45) Date of Patent: Nov. 3, 2026

(54) METHOD FOR ACTIVATING ELECTROCHEMICAL PROPERTY OF CATHODE ACTIVE MATERIAL FOR LITHIUM SECONDARY BATTERY AND CATHODE ACTIVE MATERIAL FOR LITHIUM SECONDARY BATTERY

(71) Applicant: POSTECH RESEARCH AND BUSINESS DEVELOPMENT FOUNDATION, Pohang-si (KR)

(72) Inventors: Byoung-woo Kang, Pohang-si (KR); Jung-hwa Lee, Gumi-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 1003 days.

(21) Appl. No.: 18/007,856

(22) PCT Filed: Jun. 4, 2021

(86) PCT No.: PCT/KR2021/007044
§ 371 (c)(1),
(2) Date: Dec. 2, 2022

(87) PCT Pub. No.: WO2021/246830
PCT Pub. Date: Dec. 9, 2021

(65) Prior Publication Data
US 2023/0231125 A1 Jul. 20, 2023

(30) Foreign Application Priority Data
Jun. 5, 2020 (KR) ........................ 10-2020-0068062

(51) Int. Cl.
*H01M 4/505* (2010.01)
*C01G 53/50* (2025.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
CPC ................. H01M 4/505; H01M 4/525; H01M 2004/028; H01M 4/0445; H01M 4/131;
(Continued)

(56) References Cited

U.S. PATENT DOCUMENTS

2011/0052989 A1* 3/2011 Venkatachalam ............................ C01G 45/1257 429/223
2016/0133931 A1* 5/2016 Kim ....................... C01G 51/50 252/182.1
2019/0386294 A1* 12/2019 Han ...................... H01M 4/131

FOREIGN PATENT DOCUMENTS

KR 10-2014-0073953 6/2014
KR 10-2015-0015412 2/2015

OTHER PUBLICATIONS

Han et al. "Surface structural conversion and electrochemical enhancement by heat treatment of chemical pre-delithiation processed lithium-rich layered cathode material" Journal of Power Sources 268 (2014) pp. 683-691 (Year: 2014).*

(Continued)

*Primary Examiner* — Andrew J. Oyer
(74) *Attorney, Agent, or Firm* — LEX IP MEISTER, PLLC

(57) ABSTRACT

The method includes a delithiation step of deintercalating a part of lithium of a Li-rich metal oxide represented by [Formula 1] below and having a layered structure, and a heat-treatment step of heat-treating the delithiated Li-rich metal oxide, thereby allowing dispersion to be achieved through diffusion of M' and/or M elements constituting the Li-rich metal oxide:

(Continued)

$a\{Li_2M'O_3\}\cdot(1-a)\{LiMO_2\}$ or $Li_{1+x}(M'M)_{1-x}O_2$ [Formula 1]

(wherein 0<a<1.0, M' and M are one or more selected from 3d, 4d, 5d transition metals or non-transition metals including Al, Mg, Mn, Ni, Co, Cr, V and Fe, and satisfy electrical neutrality according to the type and oxidation number of M' and M and an amount of lithium in a layered structure of a material.

7 Claims, 4 Drawing Sheets

(51) Int. Cl.
*H01M 4/02* (2006.01)
*H01M 4/525* (2010.01)

(52) U.S. Cl.
CPC ...... *C01P 2002/52* (2013.01); *C01P 2006/40* (2013.01); *H01M 2004/028* (2013.01)

(58) Field of Classification Search
CPC ........ H01M 4/04; H01M 4/1391; H01M 4/36; H01M 10/44; H01M 10/446; H01M 10/052; C01G 53/50; C01G 53/00; C01G 53/42; C01P 2002/52; C01P 2006/40; C01D 15/02; Y02E 60/10
See application file for complete search history.

(56) References Cited

OTHER PUBLICATIONS

Liu et al. ("Remaining Li-Content Dependent Structural Evolution during High Temperature Re-Heat Treatment of Quantitatively Delithiated Li-Rich Cathode Materials with Surface Defect-Spinel Phase" ACS Appl. Mater. Interfaces 2020, 12, pp. 27226-27240 (Year: 2020).*

Liu, Yang, et al. "Remaining Li-content dependent structural evolution during high temperature re-heat treatment of quantitatively delithiated Li-rich cathode materials with surface defect-spinel phase." ACS applied materials & interfaces 12.24 (May 21, 2020): 27226-27240.

Wang, Rui, et al. "Atomic structure of Li2MnO3 after partial delithiation and re-lithiation." Advanced Energy Materials 3.10 (Jun. 6, 2013): 1358-1367.

Sarkar, Tanmay, et al. "Li-Removal Mechanism and Its Effect on Oxygen Stability Influencing the Electrochemical Performance of Li1. 17Ni0. 17Mn0. 67O2: Experimental and First-Principles Analysis." The Journal of Physical Chemistry C 121.38 (Sep. 2017): 20591-20596.

* cited by examiner

【FIG.1】
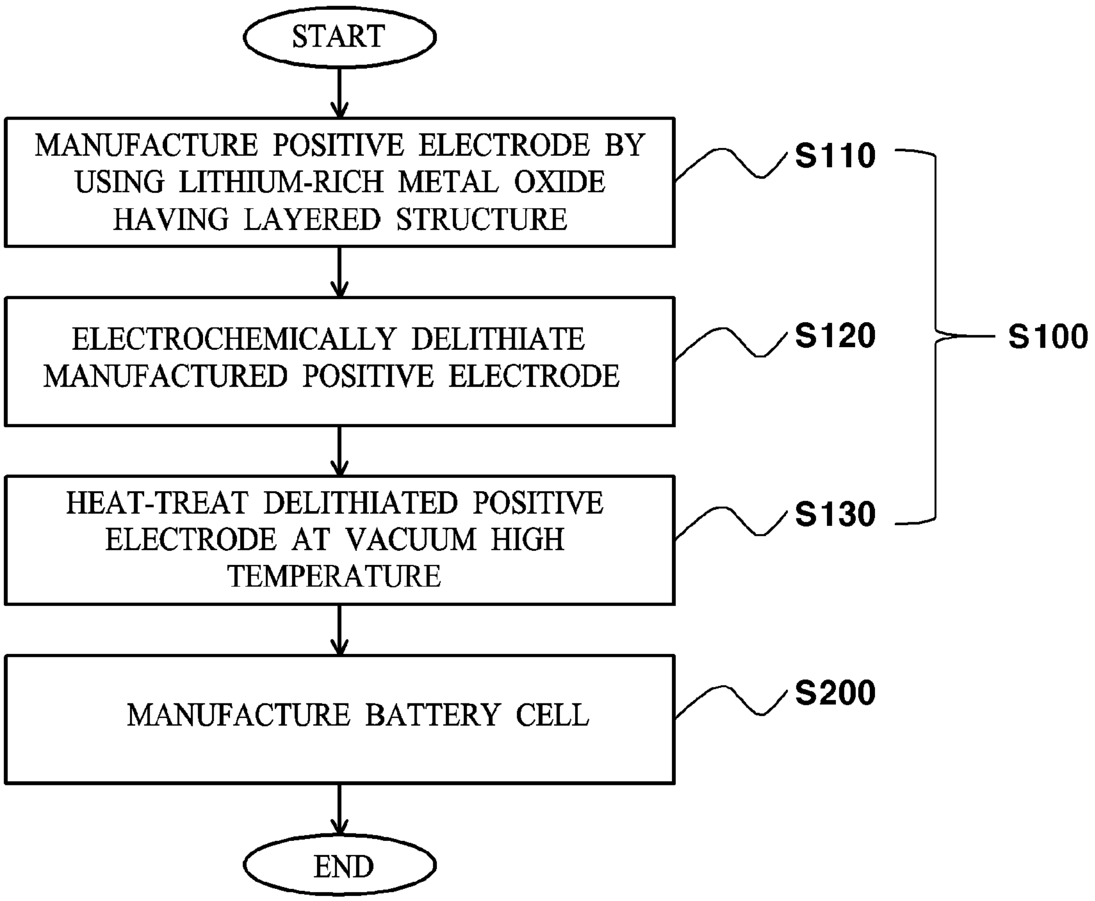

【FIG.2】
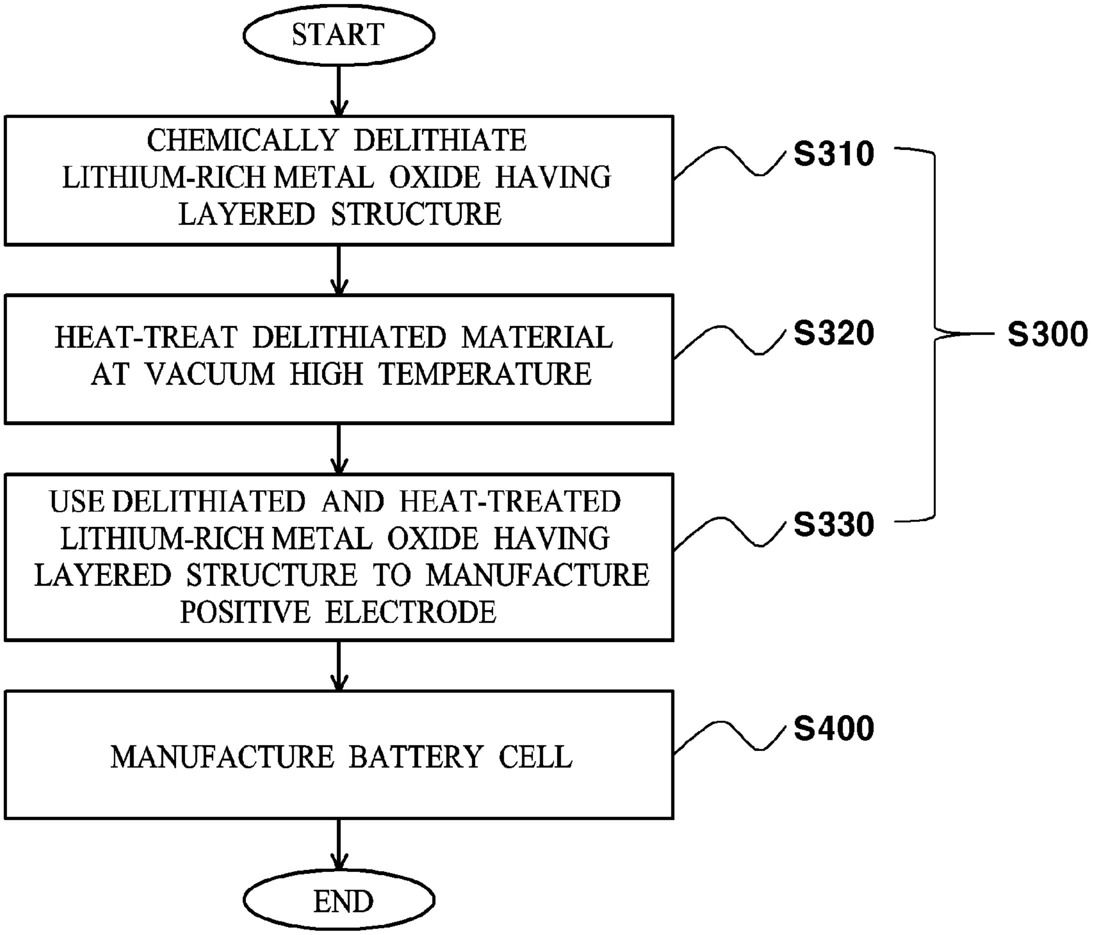

【FIG.3】
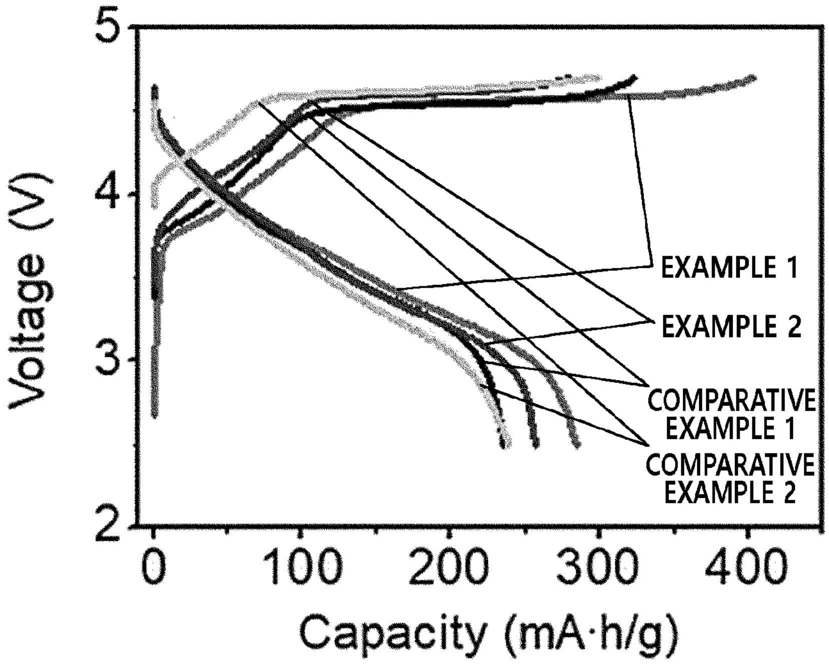

【FIG.4】
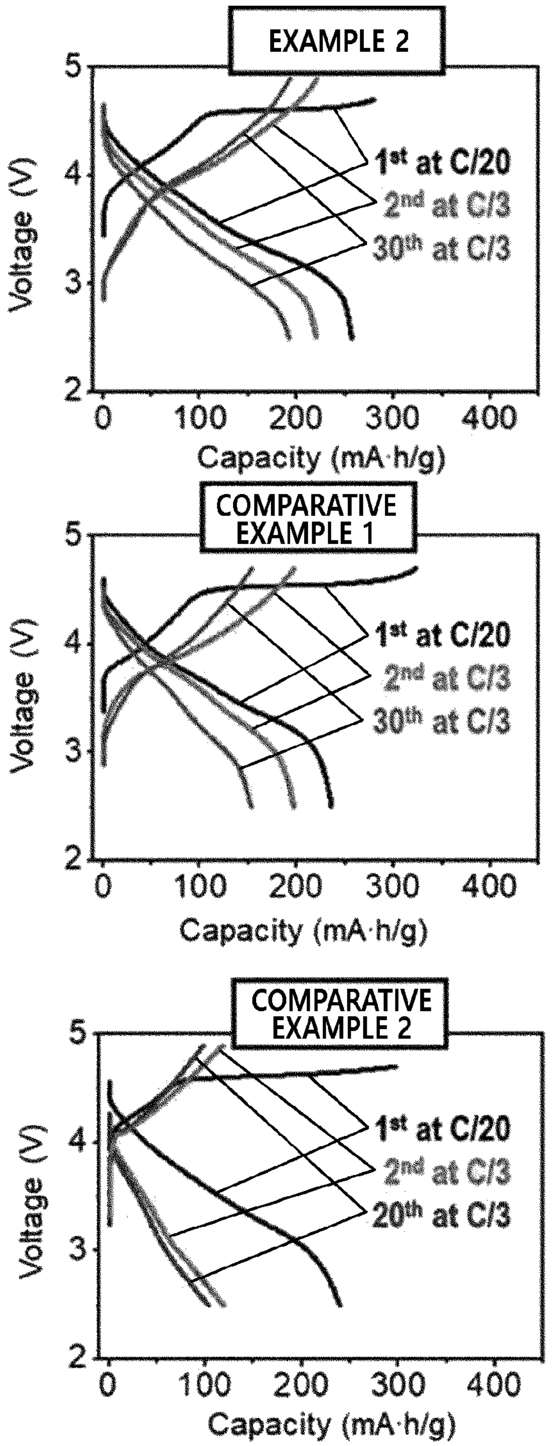

METHOD FOR ACTIVATING ELECTROCHEMICAL PROPERTY OF CATHODE ACTIVE MATERIAL FOR LITHIUM SECONDARY BATTERY AND CATHODE ACTIVE MATERIAL FOR LITHIUM SECONDARY BATTERY

TECHNICAL FIELD

The present invention relates to a method for activating electrochemical property of a cathode active material for a lithium secondary battery, and more specifically, to a method for improving electrochemical property while maintaining a layered structure of a cathode active material composed of a Li-rich metal oxide having the layered structure.

BACKGROUND ART

In recent years, with the rapid development of eco-friendly vehicles and large-capacity energy storage systems along with the development of electricity, electronics, communication, and computer industries, the development of lithium secondary batteries with high safety, large energy capacity, and low cost has become very important. Particularly, in order to apply lithium secondary batteries to medium-and-large devices such as electric vehicles, it is essential to implement a high capacity energy density, and accordingly, it is becoming increasingly important to develop cathode material materials that determine the performance of such batteries and determine the overall cost.

Cathode active materials that have been studied significantly so far are mainly $LiCoO_2$ (lithium cobalt oxide, LCO)-based active materials having a layered structure, and in addition, $LiNiO_2$ (lithium nickel oxide, LN0) having a layered crystal structure, $LiNi_xMn_yCo_zO_2$ and the like which are related thereto, and a lithium-containing manganese oxide of $LiMnO_2$ (lithium manganese oxide, LM0) have been considered to be used. The cathode active materials as described above are showing difficulties in being used as cathode materials for next-generation electric vehicles because when a charge/discharge reaction in which lithium is deintercalated/intercalated occurs, the supply of electrons is caused by an oxidation/reduction reaction of a transition metal, so that a theoretical capacity is determined by the amount of the transition metal, resulting in a significant limitation in capacity increase.

In this regard, a lithium-rich metal oxide having a layered structure is a cathode active material having a high capacity in which the supply of electrons is 240 mAh/g or greater per unit weight through an oxidation/reduction reaction of oxygen as well as a transition metal when a charge/discharge reaction in which excess lithium is deintercalated/intercalated, and thus, is attracting attention as a high-capacity cathode material for electric vehicles and power storage that require high-capacity property.

In order to maximize an electrochemical energy storage capacity of the lithium-rich metal oxide having a layered structure, an activation reaction in an initial charge reaction in the first cycle is very important because an initial activation reaction greatly affects the determination of a reversible energy density thereafter. In addition, in an initial charge activation reaction, as well as a reversible transition metal oxidation reaction, there is a characteristic voltage plateau region in the 4.4 V to 4.6 V section that does not appear in a typical cathode material, and in this section, not only an oxidation reaction of oxygen but also an irreversible generation of oxygen gas occurs, resulting in structural instability from a surface and accordingly, there is a disadvantage in that a high discharge capacity may be secured in the initial activation reaction due to the structural collapse of a material and a side reaction between the released oxygen gas and an electrolyte at the same time. Particularly, in the initial activation reaction, if activation does not occur sufficiently in a voltage plateau region related to an oxygen reaction, it is difficult to obtain a high discharge capacity and it is difficult to obtain a high capacity in subsequent cycles, so an activation reaction in an initial charge/discharge is very important. However, a lithium-rich metal oxide having a layered structure in which activation occurs sufficiently in a voltage plateau region related to an oxygen reaction in an initial activation reaction, is not known.

Accordingly, there is a limit in terms of energy density in order to apply a typical positive active material of a lithium secondary battery to electric vehicles and medium-to-large equipment, so that there is an increasing need for the development of a lithium-rich metal oxide having a layered structure capable of reversibly using a transition metal and an oxygen reaction at the same time.

As described above, although a lithium-rich metal oxide having a layered structure has a high theoretical capacity, due to problems such as structural stability and an irreversible reaction of oxygen in an initial activation reaction, it is difficult to secure a high reversible capacity due to poor initial activation, which greatly affects the energy density of subsequent cycles, so that in order to apply the lithium-rich metal oxide having a layered structure with a high capacity and a high energy density to a secondary battery, it is essential to maximize the initial activation reaction in the first cycle.

DISCLOSURE OF THE INVENTION

Technical Problem

The purpose of the present invention is to provide a method for performing an activation treatment to increase the initial electrochemical reaction activity of a cathode active material including a lithium-rich metal oxide, and a cathode active material treated by the method.

Technical Solution

According to an embodiment of the present invention, there is provided a method for activating electrochemical property of a cathode active material for a lithium secondary battery, the method including a delithiation step of deintercalating a part of lithium of a Li-rich metal oxide represented by [Formula 1] below and having a layered structure, thereby allowing a plurality of Li vacancies to be generated in a crystal structure of the Li-rich metal oxide, and a heat-treatment step of heat-treating the delithiated Li-rich metal oxide, thereby allowing dispersion to be achieved through diffusion of M' and/or M elements constituting the Li-rich metal oxide.

$$a\{Li_2M'O_3\}\cdot(1-a)\{LiMO_2\} \text{ or } Li_{1+x}(M'M)_{1-x}O_2 \quad \text{[Formula 1]}$$

(wherein 0<a<1.0, M' and M are one or more selected from 3d, 4d, 5d transition metals or non-transition metals including Al, Mg, Mn, Ni, Co, Cr, V and Fe, and satisfy electrical neutrality according to the type and oxidation number of M' and M and an amount of lithium in a layered structure of a material.

According to another embodiment of the present invention, there is provided a cathode active material having a composition composed of [Formula 1] below.

$$a\{Li_2M'O_3\}\cdot(1-a)\{LiMO_2\} \text{ or } Li_{1+x}(M'M)_{1-x}O_2 \quad \text{[Formula 1]}$$

(wherein 0<a<1.0, M' and M are one or more selected from 3d, 4d, 5d transition metals or non-transition metals including Al, Mg, Mn, Ni, Co, Cr, V and Fe, and satisfy electrical neutrality according to the type and oxidation number of M' and M and an amount of lithium in a layered structure of a material.

Advantageous Effects

In the present invention, heat is applied after allowing a part of lithium to be delithiated in an initial charge reaction state (SOC) or an initial charge of a cathode active material including a lithium-rich metal oxide having a layered structure, so that the cathode active material has a structure with increased electrochemical activity while the layered structure is maintained, and accordingly, compared to a cathode active material composed of a typical lithium-rich metal oxide, it is possible to implement a high capacity and a high energy that are stably reversible in a charging/discharging cycle.

In addition, an activation treatment method according to the present invention may utilize a process performed in a current lithium secondary battery manufacturing process, and thus has good process suitability.

BRIEF DESCRIPTION OF THE DRAWINGS

FIG. 1 is a manufacturing process diagram of an activation process of a cathode active material according to Example 1 of the present invention and a battery cell using the same.

FIG. 2 is a manufacturing process diagram of an activation process of a cathode active material according to Example 2 of the present invention and a battery cell using the same.

FIG. 3 shows results of evaluating charge and discharge property of $Li_{1.2}Ni_{0.2}Mn_{0.6}O_2$, which is a Li-rich metal oxide having a layered structure, treated according to Example 1, Example 2, Comparative Example 1, and Comparative Example 2 of the present invention.

FIG. 4 shows results of evaluating cycle property of $Li_{1.2}Ni_{0.2}Mn_{0.6}O_2$, which is a Li-rich metal oxide having a layered structure, treated according to Example 2, Comparative Example 1, and Comparative Example 2 of the present invention.

MODE FOR CARRYING OUT THE INVENTION

A method according to the present invention is characterized by including a delithiation step of deintercalating a part of lithium of a Li-rich metal oxide represented by [Formula 1] below and having a layered structure, thereby allowing a plurality of Li vacancies to be generated in a crystal structure of the Li-rich metal oxide, and a heat-treatment step of heat-treating the delithiated Li-rich metal oxide, thereby allowing dispersion to be achieved through diffusion of M' and/or M elements constituting the Li-rich metal oxide.

$$a\{Li_2M'O_3\}\cdot(1-a)\{LiMO_2\} \text{ or } Li_{1+x}(M'M)_{1-x}O_2 \quad \text{[Formula 1]}$$

(wherein 0<a<1.0, M' and M are one or more selected from 3d, 4d, 5d transition metals or non-transition metals including Al, Mg, Mn, Ni, Co, Cr, V and Fe, and satisfy electrical neutrality according to the type and oxidation number of M' and M and an amount of lithium in a layered structure of a material.

A theoretical capacity determined by electrons that may be provided by a change in the oxidation number of a transition metal of most lithium-rich metal oxides having a layered structure is limited approximately by an amount of the transition metal (e.g., ~125 mAh/g in the case of $Li_{1.2}Ni_{0.2}Mn_{0.6}O_2$), and if a theoretical capacity determined by an amount of lithium is not limited and the supply/release of electrons is reversible by oxygen, an usable capacity of a lithium-rich layered structure is determined by an amount of available lithium. In the case of $Li_{1.2}Ni_{0.2}Mn_{0.6}O_2$, in order to use an amount of all lithium at a reversible capacity (~390 mAh/g), an oxidation/reduction reaction of oxygen ions must be activated, not oxygen gas release.

In the case of a typical lithium-rich metal oxide having a lithium (e.g., in the case of $Li_{1.2}Ni_{0.2}Mn_{0.6}O_2$), not only an oxidation/reduction reaction by a transition metal but also an oxidation/reduction reaction by a transition metal occurs, and a reversible capacity of 240 mAh/g which is much less than theoretical capacity of ~390 mAh/g is obtained, which is due to the fact that a reversible oxygen ion reaction does not have a high degree of activation.

In order to secure a large reversible capacity in a cathode active material made of a lithium-rich metal oxide, it is very important to sufficiently achieve initial electrochemical activity so as to obtain a high capacity reversibly in subsequent cycles, so that it is very important to activate the initial electrochemical activity. At this time, in order to allow a large amount of lithium to reversibly contribute to the capacity, structural stability is essential so that a layered structure does not collapse during the process of deintercalating the large amount of lithium.

In order to induce high initial electrochemical reactivity while ensuring structural stability as described above, the present inventors have devised an activation treatment that essentially requires the above two steps.

First, a part of lithium constituting a lithium-rich metal oxide is delithiated to induce a plurality of lithium vacancies in a crystal structure. At this time, it is important to prevent damage to a layered structure of the lithium-rich metal oxide during the delithiation process.

Next, by heat-treating the lithium-rich metal oxide in which a plurality of lithium vacancies are induced in the crystal structure, structural and/or chemical changes may be induced in a form capable of increasing oxygen reactivity in an initial activation step, particularly, a voltage plateau section of 4.4 to 4.6 V, through re-distribution by diffusion of M' and/or M elements which are cations constituting the lithium-rich metal oxide.

The lithium-rich metal oxide in which structural and/or chemical changes have been induced has a structure advantageous for maintaining structural stability even when a large amount of lithium is released in an initial electrochemical activation reaction, and has a high initial activity, and thus may implement a high capacity and a high energy stably reversible in charge and discharge cycles. In addition, as an initial electrochemical reaction activity has increased, a cathode active material according to the present invention secures a charging capacity of at least 70% of the theoretical capacity of an oxygen electrochemical reaction at a high voltage of a level equal to or higher than a voltage plateau, and thus may have a high electrochemical activity in which a capacity of the entire charging period is close to the theoretical capacity. Therefore, it is possible to have a reversible high discharge capacity of at least 65% of the theoretical capacity of a lithium-rich material even in a subsequent discharge reaction.

The method according to the present invention may be applied to all metal oxides having a layered structure including an excessive amount of lithium.

In addition, in the delithiation step, it is preferable that an amount of lithium to be delithiated is 10 to 30 mol % in the total constituting the lithium-rich metal oxide. When the amount of lithium to be delithiated is less than 10 mol %, it is not sufficient to induce structural and chemical changes in a form capable of increasing oxygen reactivity in an initial activation step, particularly in a voltage plateau section of 4.4 to 4.6 V, and when lithium in excess of 30 mol % is deintercalated, an excessive amount of lithium vacancies (Li vacancy) is induced in the structure and becomes a cause of collapse of the layered structure in a subsequent heat-treatment step, so that there is a problem in that the electrochemical activity is rather decreased.

In addition, in the delithiation step, it is preferable that an amount of lithium to be delithiated is in a range that will not reach a characteristic voltage plateau portion in the 4.4 to 4.6 V section which is shown in the lithium-rich metal oxide. This is because the amount of lithium to be delithiated determines an amount of vacancies caused by the absence of lithium, so that an appropriate amount of lithium should be deintercalated to induce activation without collapse of the layered structure. Therefore, in order to increase the activation reaction of the lithium-rich layered structure in the first cycle, the amount of delithiation is very important. Particularly, when such a process is performed, due to an increased initial electrochemical activity, a capacity of a characteristic voltage plateau of 4.4 to 4.6 V secures a charge capacity of at least 70% of the theoretical capacity of an oxygen electrochemical reaction in a lithium-rich material having a layered structure in an initial charge reaction, so that a high electrochemical activity in which a capacity of the entire charging period is close to the theoretical capacity may be obtained. Therefore, it is characterized by having a reversible high discharge capacity of at least 65% of the theoretical capacity of the lithium-rich material having a layered structure even in a subsequent discharge reaction.

In addition, the delithiation step may be performed, for example, through one or more methods selected from an electrochemical delithiation method and a chemical delithiation method. It is not particularly limited as long as it is a method capable of delithiating a cathode active material.

Among the methods, a charging method for electrochemical delithiation may be appropriately adjusted according to the composition of a cathode and characteristics of the constituent elements. For example, through adjustment of cut-off voltage of charging, a state of charge (SOC) current, a charging/discharging method (constant current charging, pulse charging) and the like may be adjusted. In addition, in the chemical delithiation, lithium may be chemically reacted with a lithium adsorbent. As the lithium adsorbent, a material such as, for example, a $BF_4$ salt or an ammonium salt may be used.

In addition, in the heat treatment step, an electrode delithiated by electrochemical delithiation or powder chemically delithiated may be heat-treated.

In addition, the heat-treatment step may be preferably performed at 50 to 300° C. When the delithiated electrode is heat-treated at a temperature of lower than 50° C., it is difficult to induce the aforementioned structural change, and when the heat-treatment is performed at a high temperature of higher than 300° C., serious structural collapse may occur similar to a case in which lithium is deintercalated by greater than 30 mol %, and thus it is preferable to perform the heat-treatment at 50 to 300° C.

As described above, the present invention has a remarkable difference from a typical method for preparing a cathode active material in that heat-treatment is performed at 50 to 300° C. after delithiation to induce a structural change such as distribution of cations including lithium after the delithiation, thereby forming a stable and favorable form for activation.

In addition, the heat-treatment step may be performed for 6 hours to 24 hours. When the heat-treatment time is less than 6 hours, it is not sufficient to obtain a structure distribution required in the present invention, and when greater than 24 hours, it is not only unnecessary in terms of energy, but there is a problem in that structurally unwanted structural collapse occurs in a form in which atoms are mixed between a large amount of lithium and transition metal layers, so that it is preferable to perform the heat-treatment within a range of 6 to 24 hours.

The present invention may also provide a lithium secondary battery including a cathode active material manufactured by the above manufacturing method.

In order to manufacture a lithium secondary battery, the lithium secondary battery is composed by using a lithium-rich metal oxide having a layered structure and initially activated as described above as a cathode material, an anode, a separator interposed between a cathode and the anode, and a lithium salt-containing non-aqueous electrolyte, and other components of the lithium secondary battery will be described below.

The cathode may be formed by coating an electrode mixture including the initially activated lithium-rich metal oxide as a cathode material, a conductive material, a binder resin, and a solvent on a metal current collector to form a film, and then drying the film. A method for forming the cathode is not limited to the form of coating on a metal current collector, and may be performed in various ways such as a thin film electrode.

The metal current collector is generally to a thickness of 10 to 200 μm, and the metal current collector to be coated is not particularly limited as long as it has high conductivity without causing a chemical change in the battery. For example, aluminum, stainless steel, or the like may be used.

The conductive material is typically added in an amount of 1 wt % to 30 wt % based on the total weight of a mixture including a cathode active material. The conductive material is not particularly limited as long as it has conductivity without causing a chemical change in the battery. For example, natural graphite, artificial graphite, or the like may be used.

The binder is a component for assisting in bonding of an active material and a conductive material, and the like, and in bonding with respect to a current collector, and is typically added in an amount of 1 wt % to 20 wt % based on the total weight of a mixture including a cathode active material. For example PVDF, PTFE, or the like may be used.

The anode may be manufactured by using an anode active material itself, or if necessary, by coating, drying, and pressing an anode active material selectively including a conductive material, a binder, or the like as described above.

The anode active material may be, for example, a lithium metal or a graphite-based carbon.

The separator is interposed between the cathode and the anode, and an insulating thin film having high ion permeability and mechanical strength is used. For example, a polymer such as chemically resistant and hydrophobic polypropylene may be used.

The lithium salt-containing non-aqueous electrolyte is composed of a non-aqueous electrolyte and a lithium salt, and as the non-aqueous electrolyte, ethylene carbonate or dimethyl carbonate, which is a non-aqueous organic solvent, is used, but the non-aqueous electrolyte is not limited thereto.

The lithium salt is a material soluble in the non-aqueous electrolyte, and for example, $LiPF_6$, LiCl, $LiClO_4$, or the like may be used.

MODE FOR CARRYING OUT THE INVENTION

Hereinafter, with reference to the accompanying drawings, embodiments of the present invention will be described in detail.

However, the following exemplary embodiments may be modified in various other forms, and the scope of the present invention is not limited to the embodiments described below. The embodiments of the present invention are provided to more fully describe the present invention to those skilled in the art.

Example 1

FIG. 1 is a manufacturing process diagram of a cathode according to Example 1 of the present invention and a battery cell using the same.

Referring to FIG. 1, a method according to Example 1 of the present invention includes manufacturing a cathode by using a cathode active material composed of a lithium-rich metal oxide having a layered structure S110, delithiating the manufactured cathode by an electrochemical method S120, performing a pre-activation treatment S100 including heat-treating the delithiated cathode at a vacuum high temperature S130, and manufacturing a battery cell using the pre-activated cathode S200.

In Example 1 of the present invention, each of the above processes was performed as follows.

Manufacturing Cathode S110

First, 80 wt % of $Li_{1.2}Ni_{0.2}Mn_{0.6}O_2$ powder (cathode active material), which is a lithium-rich metal oxide having a layered structure, 15 wt % of Super P, which is a conductive material, and PVDF, which is a binder, were added to NMP to prepare a cathode mixture slurry. The prepared cathode mixture slurry was coated on one surface of an aluminum current collector, dried and roll-pressed, and then punched to a predetermined size to manufacture a cathode having a cathode active material layer formed therein.

Performing Electrochemical Delithiation S120

For the electrochemical delithiation, a half-cell was first manufactured, and to this end, a lithium metal foil was used as an anode, and a separator was interposed between a cathode manufactured by the above-described method and the lithium metal foil, and then an electrolyte prepared by dissolving 1 M of $LiPF_6$ in a solvent in which ethylene carbonate (EC) and diethyl carbonate (DEC) were mixed in a volume ratio of 50:50 was injected to manufacture a coin-type half-cell. Next, in order to delithiate the cathode, the cathode was charged at a constant current rate of about 14 mA/g in a constant current manner for about 4 hours and 20 minutes at room temperature, and at this time, a charging capacity of about 60 mAh/g was secured, which shows that about 15 mol % of the total lithium was deintercalated.

Heat-Treating Delithiated Cathode S130

The cathode was separated from the delithiated cell by an electrochemical method, washed and dried using dimethyl carbonate (DMC), and then heat-treated in a vacuum oven at a temperature of about 60° C. for 12 hours.

Manufacturing Battery Cell S200

A separator was interposed between the cathode, on which the electrochemical delithiation and subsequent heat treatment were performed by the above-described method, and a lithium foil, which was an anode, and then an electrolyte prepared by dissolving 1 M of $LiPF_6$ in a solvent in which ethylene carbonate (EC) and diethyl carbonate (DEC) were mixed in a volume ratio of 50:50 was injected thereto to manufacture a coin-type half-cell.

Example 2

FIG. 2 is a manufacturing process diagram of a cathode active material according to Example 1 of the present invention and a battery cell using the same.

Referring to FIG. 2, a method according to Example 2 of the present invention is a chemical method, and manufactures a battery cell through a pre-activation treatment step S300 including delithiating a cathode active material made of a lithium-rich metal oxide having a layered structure S310, heat-treating the delithiated cathode active material at a vacuum high temperature S320, and using the delithiated and heat-treated cathode active material to manufacture a cathode S330, and manufacturing a battery cell using the pre-activation-treated cathode S400.

In the sense of pre-activating a lithium-rich metal oxide having a layered structure, the processes of Example 1 and Example 2 are similar, but are different in that the method according to Example 1 performs a pre-activation step after manufacturing a cathode active material in an electrode state whereas the process of Example 2 performs a pre-activation step in a cathode active material powder state.

In addition, in the case of Example 1 and Example 2, there is no difference in that the initial electrochemical activity is increased through inducing a structural change in a material through performing heat-treatment after delithiation. However, when the process of Example 2 is applied, unlike the process of Example 1 in which an electrode including a conductive material and a binder resin is heat-treated, there is an advantage in that a side reaction during heat-treatment may be excluded since only a cathode active material itself is delithiated in a powder state and then heat-treated, and that a larger amount of cathode active material may be treated.

In Example 2 of the present invention, each of the above processes was performed as follows.

Performing Chemical Delithiation S310

$Li_{1.2}Ni_{0.2}Mn_{0.6}O_2$ powder, which is the lithium-rich metal oxide having a same layered structure as in Example 1, was used as a cathode active material. In order to chemically delithiate the cathode active material, the cathode active material was reacted with $NO_2BF_4$, which was a lithium adsorbent. At this time, since about 0.18 mol of lithium was required to be deintercalated to deintercalate about 15 mol % of lithium, 0.18 mol of $NO_2BF_4$ and 1 mol of $Li_{1.2}Ni_{0.2}Mn_{0.6}O_2$ were added to an acetonitrile solvent, and a stirred process was performed thereon for about 12 hours. The stirred sample was dried using a hot plate at a temperature of about 80° C.

Heat-Treating Delithiated Powder S320

On the cathode active material powder delithiated by the above-described process, heat-treatment was performed using a box furnace at a temperature of about 200° C. for 12 hours.

Manufacturing Cathode S330

80 wt % of the cathode active material delithiated and heat-treated by the above-described process, 15 wt % of Super P, and PVDF (binder) were added to NMP to prepare a cathode mixture slurry. The prepared cathode mixture slurry was coated on one surface of an aluminum current collector, dried and roll-pressed, and then punched to a predetermined size to manufacture a cathode having a cathode active material layer formed therein.

Manufacturing Battery Cell S400

A lithium foil was used as an anode, and a separator was interposed between the cathode and the lithium metal foil, and then an electrolyte prepared by dissolving 1 M of $LiPF_6$ in a solvent in which ethylene carbonate (EC) and diethyl carbonate (DEC) were mixed in a volume ratio of 50:50 was injected thereto to manufacture a coin-type half-cell.

Comparative Example 1

In Comparative Example 1, a lithium-rich metal oxide of a layered structure having the same composition as in Example 1 and Example 2 was used as a cathode active material to prepare a battery without a separate treatment.

Specifically, 80 wt % of $Li_{1.2}Ni_{0.2}Mn_{0.6}O_2$, 15 wt % of Super P, and PVDF were added to NMP to prepare a cathode mixture slurry. The prepared cathode mixture slurry was coated on one surface of an aluminum current collector, dried and roll-pressed, and then punched to a predetermined size to manufacture a cathode having a cathode active material layer formed therein.

A lithium foil was used as an anode, and a separator was interposed between the cathode and the lithium metal foil, and then an electrolyte prepared by dissolving 1 M of $LiPF_6$ in a solvent in which ethylene carbonate (EC) and diethyl carbonate (DEC) were mixed in a volume ratio of 50:50 was injected thereto to manufacture a coin-type half-cell.

Comparative Example 2

Comparative Example 2 performs electrochemical delithiation and heat-treatment in the same manner as in Example 1, but differs from Example 1 in that the delithiation was excessively performed. The specific process is as follows.

Manufacturing Cathode 80 wt % $Li_{1.2}Ni_{0.2}Mn_{0.6}O_2$ powder having the same composition as in Example 1, 15 wt % of Super P, and PVDF were added to NMP to prepare a cathode mixture slurry. The prepared cathode mixture slurry was coated on one surface of an aluminum current collector, dried and roll-pressed, and then punched to a predetermined size to manufacture a cathode having a cathode active material layer formed therein.

Electrochemical Delithiation

First, a lithium foil was used as an anode, and a separator was interposed between a cathode manufactured by the above method and the lithium metal foil, and then an electrolyte prepared by dissolving 1 M of $LiPF_6$ in a solvent in which ethylene carbonate (EC) and diethyl carbonate (DEC) were mixed in a volume ratio of 50:50 was injected thereto to manufacture a coin-type half-cell. In order to delithiate the cathode which constitutes a half-cell, the cathode was charged at a constant current rate of about 14 mA/g for about 9 hours and 20 minutes at room temperature, and at this time, a charging capacity of about 130 mAh/g was secured, which shows that about 33% of the total lithium was deintercalated.

Heat-Treating Delithiated Cathode

The cathode was separated from the delithiated cell by an electrochemical method, washed and dried using dimethyl carbonate (DMC), and then heat-treated in a vacuum oven at a temperature of about 60° C. for 12 hours.

Manufacturing Battery Cell

A separator was interposed between the cathode, on which the electrochemical delithiation and subsequent heat treatment were performed by the above-described method, and a lithium foil, which was an anode, and then an electrolyte prepared by dissolving 1 M of $LiPF_6$ in a solvent in which ethylene carbonate (EC) and diethyl carbonate (DEC) were mixed in a volume ratio of 50:50 was injected thereto to manufacture a coin-type half-cell.

[Results of Charge/Discharge Property Evaluation]

The electrochemical behavior of each of the cells manufactured as described above was measured at room temperature. A maccor series 4000 was used as the measuring device, and the measurement started with charging from 2.5 V to 4.7 V, and the measurement was performed by applying a current at a C/20 rate with a size of 14 mA/g to both charging and discharging in the initial cycle.

FIG. 3 shows results of evaluating charge and discharge property of $Li_{1.2}Ni_{0.2}Mn_{0.6}O_2$, which is a Li-rich metal oxide having a layered structure prepared according to Example 1, Example 2, Comparative Example 1, and Comparative Example 2 of the present invention.

As confirmed in FIG. 3, in the case of Examples 1 and 2, the initial reversible discharge capacity thereof has been improved by 20 mAh/g to 50 mAh/g compared to that of Comparative Example 1. That is, through the pre-activation process according to an embodiment of the present invention, the initial electrochemical reaction activity is increased to increase the reversible discharge capacity.

Meanwhile, when the electrode and the battery were manufactured by performing delithiation of 30 mol % or more on the lithium-rich metal oxide, followed by performing heat-treatment thereon, the discharge capacity was not further improved compared to the case of performing an initial electrochemical reaction at room temperature, and the discharge voltage decreased by ~0.5 V, thereby decreasing the energy density.

FIG. 4 shows results of evaluating cycle property of $Li_{1.2}Ni_{0.2}Mn_{0.6}O_2$, which is a Li-rich metal oxide having a layered structure prepared according to Example 2, Comparative Example 1, and Comparative Example 2 of the present invention. The initial cycle was performed at the same C/20 rate.

As can be confirmed in FIG. 4, Example 2 implemented a relatively high capacity and a high energy density even in subsequent cycles compared to Comparative Examples 1 and 2.

Although the technical idea of the present invention has been described above with reference to the accompanying drawings, this is an illustrative description of a preferred embodiment of the present invention and does not limit the present invention. In addition, it is obvious that anyone skilled in the art can make various modifications and imitations within the scope of the technical idea of the present invention.

The invention claimed is:

1. A method for activating an electrochemical property of a cathode active material for a lithium secondary battery, the method comprising:

a delithiation step of deintercalating a part of lithium of a Li-rich metal oxide represented by [Formula 1] below and having a layered structure, thereby allowing a plurality of Li vacancies to be generated in a crystal structure of the Li-rich metal oxide; and a heat-treatment step of heat-treating the delithiated Li-rich metal oxide at a temperature of 50° C. to 200° C., thereby inducing redistribution of M' and/or M elements through cation diffusion within the layered crystal structure having the plurality of Li vacancies while maintaining the layered structure:

$$a\{Li_2M'O_3\}\cdot(1-a)\{LiMO_2\} \text{ or } Li_{1+x}(M'M)_{1-x}O_2 \qquad \text{[Formula 1]}$$

wherein 0<x<1, 0<a<1.0, M' and M are each one or more selected from the group consisting of Al, Mg, Mn, Ni, Co, Cr, V and Fe, and satisfy electrical neutrality according to the type and oxidation number of M' and M and an amount of lithium in a layered structure of a material.

2. The method of claim 1, wherein, in the delithiation step, an amount of lithium delithiated from the Li-rich metal oxide is 10 to 30 mol % of a total amount of the Li-rich metal oxide.

3. The method of claim 1, wherein, in the delithiation step, an amount of lithium delithiated from the Li-rich metal oxide is in a range that does not reach a characteristic voltage plateau portion in a 4.4 to 4.6 V section which is shown in the Li-rich metal oxide.

4. The method of claim 1, wherein the delithiation step is performed by one or more methods selected from an electrochemical delithiation method and a chemical delithiation method.

5. The method of claim 4, wherein in the chemical delithiation, lithium is chemically reacted with a lithium adsorbent.

6. The method of claim 1, wherein in the heat-treatment step, an electrode delithiated by electrochemical delithiation or a chemically delithiated powder is heat-treated.

7. The method of claim 1, wherein the heat-treatment step is performed for 6 to 24 hours.

* * * * *